United States Patent [19]

Honda et al.

[11] Patent Number: 5,000,156
[45] Date of Patent: Mar. 19, 1991

[54] METHOD AND DEVICE FOR DRESSING AN INNER PERIPHERAL BLADE IN A SLICING MACHINE

[75] Inventors: Katsuo Honda; Masato Inamura, both of Tokyo, Japan

[73] Assignee: Tokyo Seimitsu Co., Ltd., Tokyo, Japan

[21] Appl. No.: 310,633

[22] Filed: Feb. 15, 1989

[30] Foreign Application Priority Data

Feb. 15, 1988 [JP] Japan .................................. 63-32087
May 26, 1988 [JP] Japan ................................ 63-129299

[51] Int. Cl.$^5$ ............................................ B24B 53/65
[52] U.S. Cl. .............................. 125/11.03; 125/11.18; 51/325; 51/165.87
[58] Field of Search .............. 51/325, 5 D, 73, 165.87; 125/11 CD, 11 DG, 11.03, 11.18

[56] References Cited

U.S. PATENT DOCUMENTS

| 2,897,638 | 8/1959 | Maker | 125/11 DG |
| 4,558,686 | 12/1985 | Ono | 51/165.87 |

FOREIGN PATENT DOCUMENTS

| 0030094 | 3/1978 | Japan | 51/325 |
| 57-55014 | 11/1982 | Japan. | |
| 0199359 | 9/1987 | Japan | 51/5 D |
| 0544542 | 2/1977 | U.S.S.R. | 51/165.87 |
| 0709347 | 1/1980 | U.S.S.R. | 51/5 D |
| 1154082 | 5/1985 | U.S.S.R. | 51/165.87 |

Primary Examiner—Robert A. Rose
Attorney, Agent, or Firm—Sixbey, Friedman, Leedom & Ferguson

[57] ABSTRACT

A method and a device for dressing an inner peripheral blade used in a slicing machine which slices a silicone ingot or the like into thin wafers. In the method and device, the manner of dressing the inner peripheral blade can be determined from the career of the inner peripheral blade, the value of slicing resistance occurring during the slicing of the ingot, the amount of displacement of the inner peripheral blade during the ingot slicing, and the shape of the end face of the ingot after slicing of the ingot. Based on this determination, a dressing stick provided in the dressing device is driven, so that the inner peripheral blade can be dressed automatically.

9 Claims, 7 Drawing Sheets

CUTTING WHILE ROTATING

LOWERING WHILE ROTATING

GRINDSTONE MOVING DIRECTION

FIG. 12

GRINDSTONE MOVING DIRECTION

METHOD AND DEVICE FOR DRESSING AN INNER PERIPHERAL BLADE IN A SLICING MACHINE

BACKGROUND OF THE INVENTION

1. Field of the Invention

The present invention relates to a method and an apparatus for dressing the cutting edge of an inner peripheral blade for use in a slicing machine which is used to slice a silicone ingot or the like into thin wafers in a semiconductor manufacturing process.

2. Description of the Related Art

Conventionally, in a slicing machine, when the cutting quality of the cutting edge of an inner peripheral blade is lowered or worsened, then a necessary dressing operation is performed on the cutting edge of the inner peripheral blade judging from the then worsened conditions thereof.

Here, the cutting edge of the inner peripheral blade is formed by fixing diamond powders to the inner peripheral edges of a doughnut-shaped metal plate. To dress the thus formed cutting edge, a grindstone of a high density is applied against the cutting edge and the manner of application of the grindstone is adjusted by an operator according to his or her judgement on the part of the cutting edge to be dressed, which judgement is based on the direction of bending of the inner peripheral blade, during the ingot slicing, slicing resistance occurring during the ingot slicing, and the like. In other words, what kind of dressing is made depends on the judgement of the operator. This means that a proper way of dressing cannot be always selected and thus this is not always reasonable.

Also, in the conventional manner of dressing, a dressing stick must be manually pushed against the inner peripheral blade that is rotating at high speeds. But, such manual operation may raise a danger to the operator.

SUMMARY OF THE INVENTION

The present invention aims at eliminating the drawbacks found in the above-mentioned conventional methods and devices.

Accordingly, it is an object of the invention to provide a method and a device for automatically dressing an inner peripheral blade in a slicing machine without resort to the perception or the like of the operator.

In order to attain the above object, according to the invention, the career of an inner peripheral blade has been previously stored in a control part. After then, there are input to the control part the value of the slicing resistance occurring while an ingot is being sliced, the amount of displacement of the inner peripheral blade during the ingot slicing, and the shape of the end face of the ingot obtained after the ingot is sliced. Then, the control part compares these data with the reference value of the slicing resistance, the reference amount of displacement of the inner peripheral blade and the shape of the ingot end face so as to determine a necessary manner of dressing. In accordance with such determination, a dressing stick provided in the dressing device is driven to thereby dress the cutting edge of the inner peripheral blade.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 7($a$) is a perspective view to illustrate how to dress the inner peripheral blade;

FIG. 7($b$) is a view taken from a B direction in FIG. 7($a$);

FIG. 7($c$) is a view taken from a C direction in FIG. 7($b$);

FIG. 7($d$) is a view taken from a D direction in FIG. 7($b$);

FIGS. 15($a$) and 15($b$) are respectively explanatory views to illustrate a relationship between the upper dressing stick and the cutting edge of the inner peripheral blade;

FIGS. 16($a$) and 16($b$) are respectively explanatory views to illustrate a relationship between the lower dressing stick and the cutting edge of the inner peripheral blade; and, FIG. 17 is a section view of a nut which can be opened or closed and also is threadedly engageable with the threaded portion of a drive shaft of the dressing stick.

DETAILED DESCRIPTION OF THE INVENTION

Detailed description will hereunder be given of the preferred embodiment of a method and a device for dressing an inner peripheral blade in a slicing machine according to the present invention with reference to the accompanying drawings.

Figure 1:
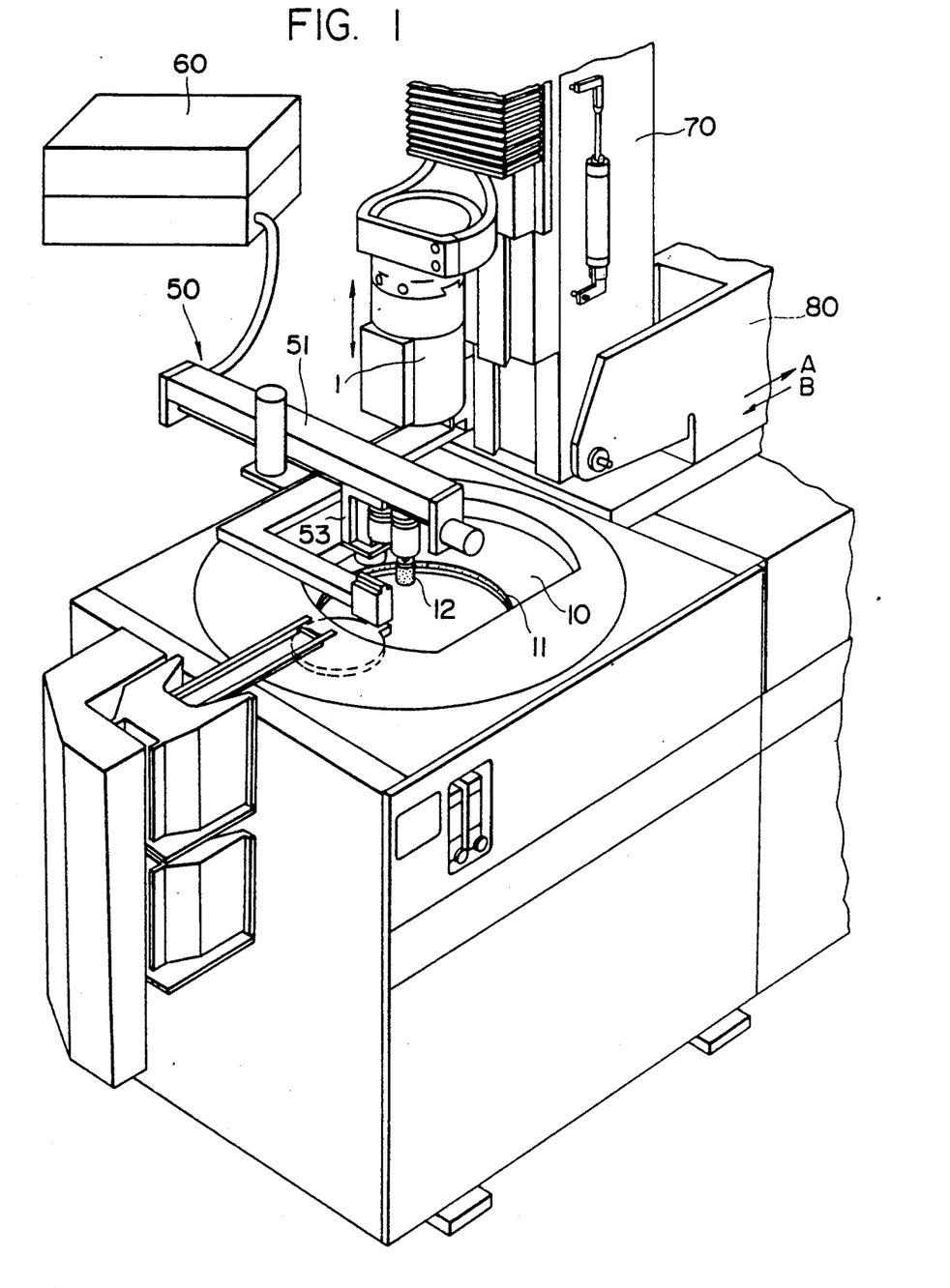
FIG. 1 is a perspective view of a general outline of a slicing machine.
Figure 2:
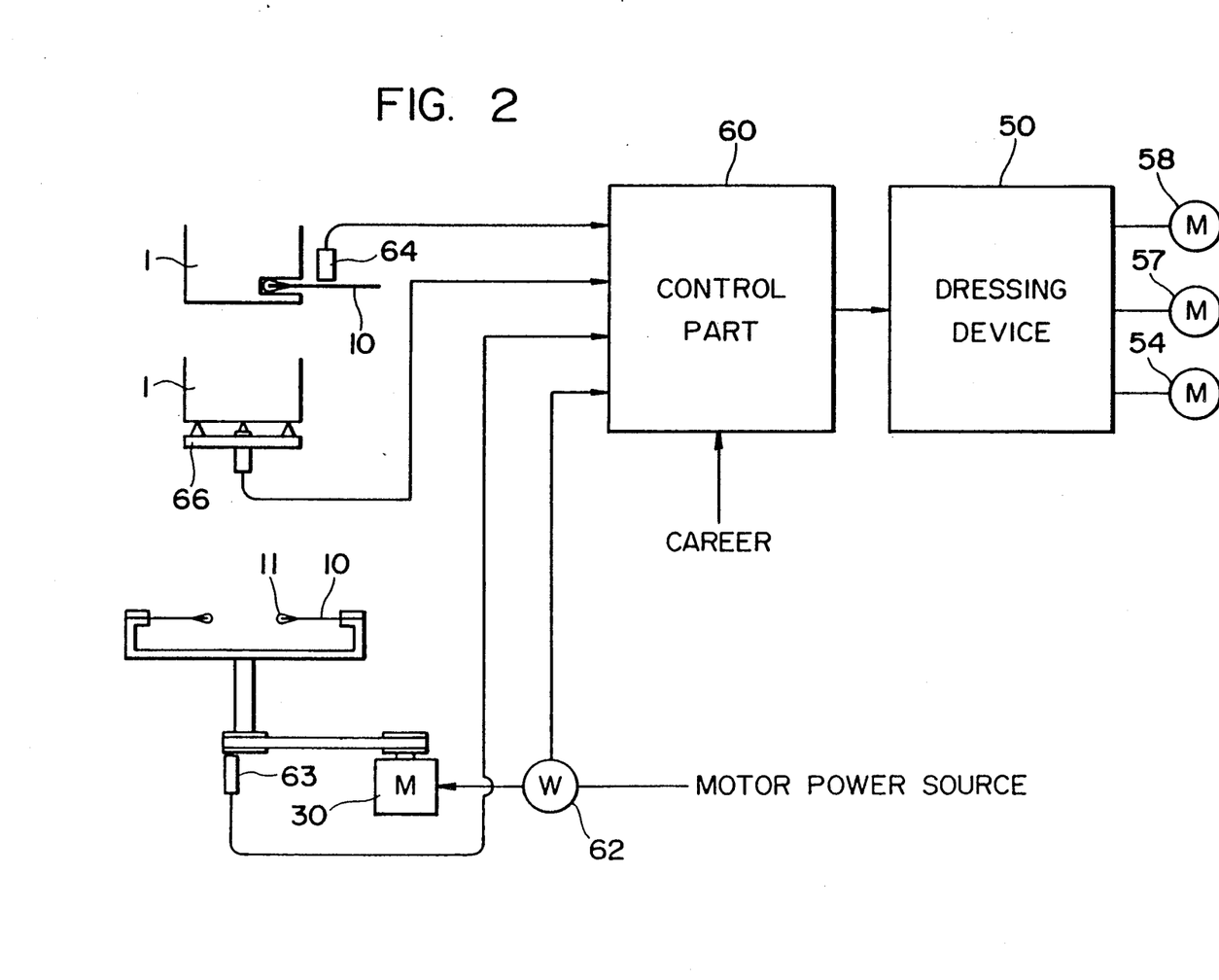
FIG. 2 is a block diagram of a control system of a dressing device, according to the invention.

As shown in FIG. 1, a doughnut-shaped inner peripheral blade 10 is rotatably arranged in a slicing machine and this inner peripheral blade 10 can be rotated at high speeds by a motor 30, as shown in FIG. 2. In the inner peripheral edges of the inner peripheral blade 10 there is provided a cutting edge 11 which is formed by fixedly securing diamond dust. The cutting edge 11 can be dressed by a dressing stick 12 which is arranged in the leading end portion of a dressing device 50. The operation of the dressing device 50 can be controlled by a control part 60.

Figure 3:
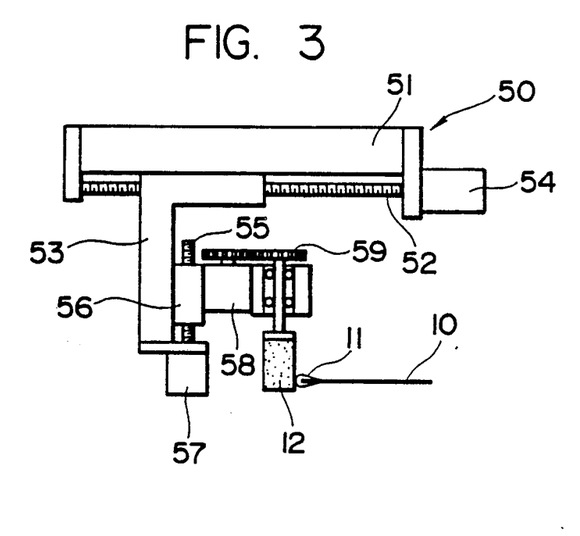
FIG. 3 is an explanatory view of a drive mechanism for the dressing device.

The detailed structure of the dressing device 50 is shown in FIG. 3. As shown in FIG. 3, the dressing device 50 includes an arm 51 in which a screw bar 52 is provided extending laterally thereof. With the screw bar 52 is threadedly engaged an inverted-L-shaped, horizontally moving table 53. The screw bar 52 can be rotationally driven by a motor 54 to thereby move the moving table 53 in a horizontal direction. In the horizontally moving table 53, there is provided a screw bar 55 which extends in a vertical direction. A vertically moving table 56 is threadedly engaged with the screw bar 55. The screw bar 55 can be rotationally driven by a motor 57 to thereby move the moving table 56 in a vertical direction. The moving table 56 has a motor 58 mounted thereto and the motor 58 can drive and rotate the dressing stick 12 by means of a gear transmission mechanism 59.

A silicon ingot, which is designated by 1 in FIG. 1, is supported by a support member 70 in such a manner that it can be moved upward or downward, and the support member 70 is erected on a table 80. This table 80 is arranged on a main body of the slicing machine in such a manner that it is free to reciprocate in the directions of arrows A and B shown in FIG. 1. Due to such structure, the ingot 1 can be pressed against the cutting edge 11 of the inner peripheral blade 10 rotating at high speeds to thereby produce thin-piece-shaped wafers.

Referring now to FIG. 2, the career of the inner peripheral blade 10 is input to the control part 60. The career of the blade 10 includes, for example, the number of the wafers that have been sliced out since the beginning of use of the blade 10, the number and types of the dressings that have been enforced during such slicing, the number of the wafers that have been sliced since the last dressing, the number of replacements of the inner peripheral blade 10, the number of tests as to the tension of the blade, the cutting or slicing tendency of the blade, and other experiences of the blade 10. That is, these data are stored one after another into the control part 60.

In the present dressing device, signals from detectors are also input to the control part 60, and the control part 60 takes into consideration such detector signals and the career data of the inner peripheral blade 10 to determine the manner of dressing. Thus, description will be given below of an example of the detector used in the present invention.

At first, a cutting resistance detector 62 will be discussed. A wattmeter 62 is used as a detector to detect a cutting resistance which is produced when the ingot 1 is sliced by rotating the inner peripheral blade 10 at high speeds and then pushing the ingot 1 against the rotating blade 10. The wattmeter 62 is arranged to measure the consumption of the electric power required for completion of slicing of a wafer and the consumption of electric power required for the cutting process and also to transmit to the control part 60 the varying signals that represent the measured electric power consumptions, so that the control part 60 can detect the cutting resistance. However, other types of detecting means can be used for this purpose. For example, according to one of such detecting means 63, the variation of the number of rotations of a spindle is detected and transmitted to the control part 60, thereby detecting the cutting resistance.

Alternatively, an inner peripheral blade displacement detector 64 can be used, which will be described below. As shown in FIG. 2, the displacement detector 64 is fixed but spaced slightly apart from the surface of the inner peripheral blade 10, so that the variations of clearance between the inner peripheral blade 10 and the displacement detector 64 can be detected. That is, the displacements in one direction and the vibrations of the inner peripheral blade 10 are detected and are then transmitted to the computer 60. For such displacement detector 64, a well known photosensor of a non-contact type or the like can be used.

Figure 4:
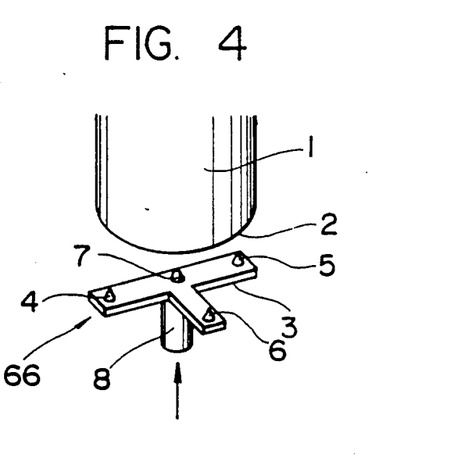
FIG. 4 is a perspective view of a device used to measure the shape of the end face of an ingot to be sliced.

Now, as another type of detector, an ingot end face shape detector 66 will be described below. This detector 66 is used to detect the outline of the shape of the end face of the ingot 1 after completion of slicing of a wafer. As shown in FIG. 4, a T-shaped member 3 is pressed upward from below against the ingot end face immediately after the ingot 1 is sliced. The member 3 includes two projections 4 and 5 which are respectively located at positions in the direction of diameter of the member 3. Also, the displacement detector 66 includes a contact 7 to detect the vertical displacements of the ingot end face. The contact 7 of the displacement detector 66 is disposed at the center of a line connecting the above-mentioned two projections 4 and 5 of the T-shaped member 3 in such a manner that it faces upward. And, there is provided a projection 6 which is arranged at right angles with respect to the line connecting the two projections 4 and 5 and con-cyclically with the two projections 4 and 5. Now, the three projections 4, 5 and 6 are pressed against the end face 2 and the plane that is formed by the three projections is detected or measured by the contact 7 of the displacement detector. After the first measurement is executed, the T-shaped member 3 is rotated by 90° and another measurement in a direction intersecting the above-mentioned plane is made. By means of comparison of the previously obtained value of a reference plane with the values that are obtained by these two measurements, the shape of the ingot end face 2 of the ingot 1 can be estimated. Here, the direction of bending of the end face from the reference plane as well as the magnitude of such bending can be determined by means of the amount of displacement of the contact 7 in these two measurements. It is believed that the bending of the ingot end face shape is caused mainly by a difference between the cutting qualities of the upper and lower sides of the cutting edge 11, that is, the end face is bent because one side of the cutting edge 11 is loaded.

With use of any of the above-mentioned detectors 62, 64, 66, various conditions of the inner peripheral blade 10 such as the loading, nicking, or de-centering of the cutting edge 11 can be confirmed from the detector's data that are obtained during or after slicing of the ingot 1.

Figure 5:
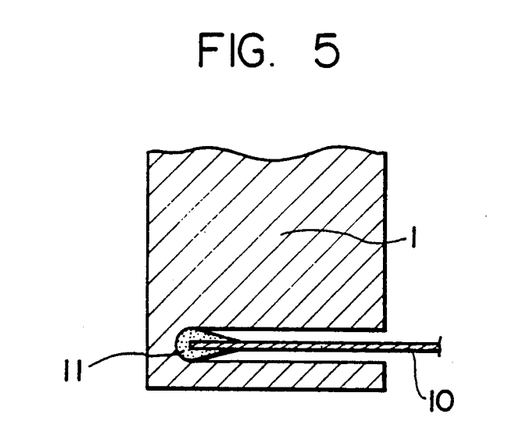
FIG. 5 is a section view of the ingot, illustrating how to slice the ingot by use of an inner peripheral blade.

Next, in FIG. 5, there is shown, in an enlarged manner, the cutting edge 11 of the inner peripheral blade 10. As discussed before, the inner peripheral blade 10 is a doughnut-shaped blade which is formed of a thin metal plate and it is provided in the inner peripheral edges thereof with the cutting edge 11 which is formed by fixing the diamond dust or powders to the inner peripheral edges of the inner peripheral blade 10. In operation, the ingot 1 is pressed against the cutting edge 11 of the inner peripheral blade 10 while the inner peripheral blade 10 is rotating, whereby the ingot 1 is sliced out into wafers. If the shape of the cutting edge 11 is changed then it can be reshaped by the following means. That is, if the cutting edge 11 is worn and deformed due to its cutting operation, then the deformed shape of the cutting edge 11 is corrected to its normal shape. This is referred to as "truing (1)" and the truing operation is used to reshape the portion of the cutting edge 11 which is shown by a and b in FIG. 6.

Another means for reshaping is to set the cutting edge 11, which is generally called a dressing operation (2). The dressing operation includes a total dressing operation to restore the cutting quality of the whole cutting edge (that is, a range shown by a, b, c, and d in FIG. 6), an upper half portion dressing operation for dressing the upper half portion, which is shown by a, of the cutting edge 11, a lower half portion dressing for dressing the lower half portion, which is shown by b, of the cutting edge 11, and a middle portion dressing for dressing the middle portions, which are respectively shown by c and d in FIG. 6, of the cutting edge 11.

For the purpose of the truing operation (1), there is formed a groove in a hard diamond grindstone, a ceramic grindstone, or other similar grindstones, and the cutting edge 11 is inserted into the thus formed groove and is rotated therein. Also, for the purpose of the dressing operation (2), a dense grindstone is used. That is, the grindstone is pressed against the desired portion of the cutting edge 11 to be dressed and the desired portion is dressed while shaving the grindstone.

Now, it should be noted here that in this specification the term "dressing" is used to include the above-mentioned two operations (1) and (2), and a device which is capable of executing the thus defined dressing operation is referred to as a dressing device.

Figures 7A, 7B:
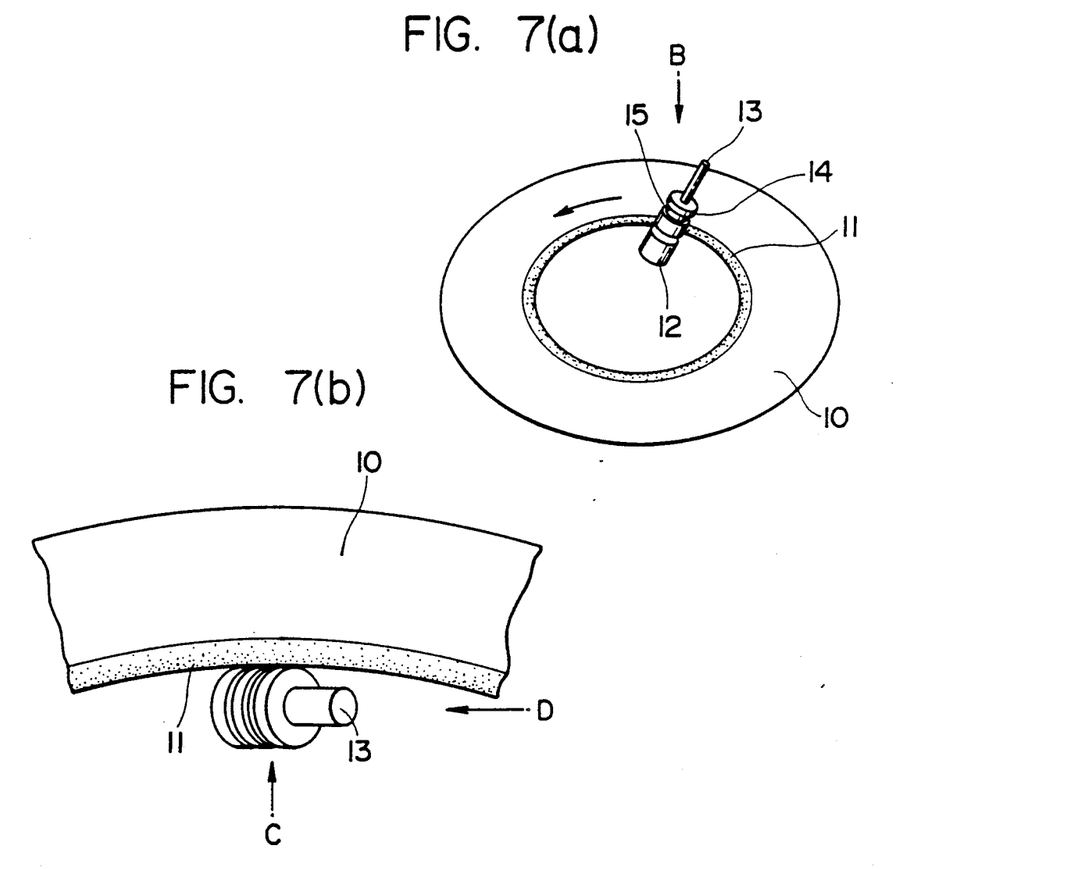
Figure 7C:
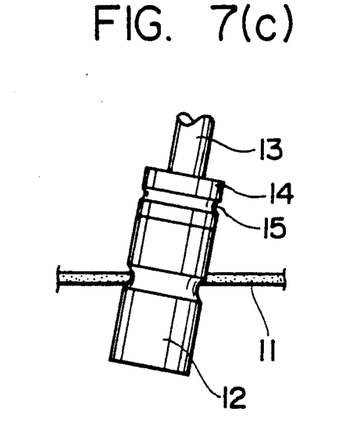
Figure 7D:
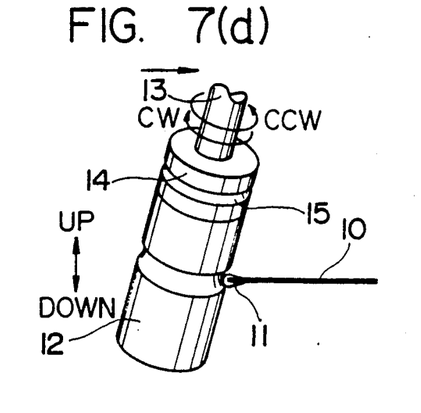

In the present invention, as shown in FIGS. 7(a), (b) and (c), the above-mentioned two operations (1) and (2) are performed by use of the dressing stick 12. Here, the dressing stick 12 is fixed to a shaft 13 and the shaft 13 is supported in such a manner that it is inclined with respect to the surface of the inner peripheral blade 10. The dressing stick or the shaft 13 is arranged to be able to rotate at low speeds, move linearly in the longitudinal direction of the shaft 13, and move horizontally for pressing the dressing stick to the cutting edge 11, and at the same time it is able to perform all of these movements simultaneously. And, there is mounted to the upper portion of the dressing stick 12 a hard material grindstone 14 for the (1) truing operation and there is formed in the grindstone 14 a groove 15 for truing.

Figure 8:
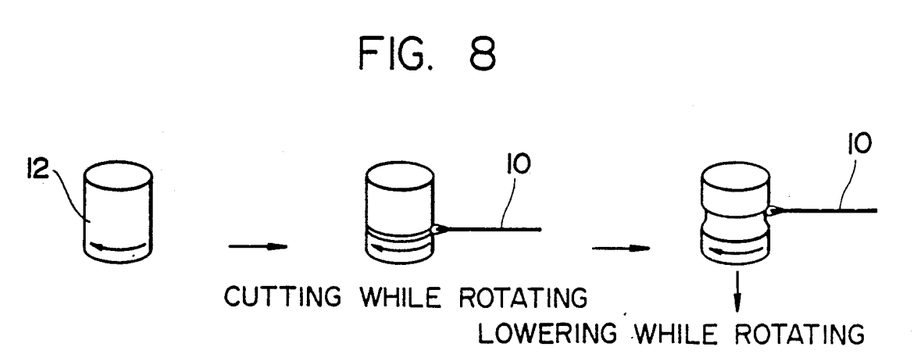
FIG. 8 is an explanatory view to illustrate how to dress the inner peripheral blade by use of a dressing stick.

Alternatively, as shown in FIG. 8, a cylindrical grindstone may be used for the grindstone 14. In this case, the inner peripheral blade 10 is moved from left to right in FIG. 8 to cut into the cylindrical grindstone. Also, a cylindrical grindstone which has been formed a groove for the inner peripheral blade 10 may be employed.

Figure 6:
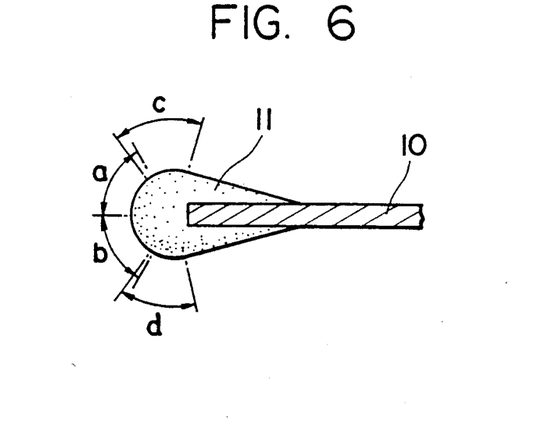
FIG. 6 is an enlarged section view of a cutting edge of the inner peripheral blade.

Also, the operations of dressing the respective portions shown by a, b, c, and d in FIG. 6 can be performed selectively as in Table 1 by means of combinations of the upward, downward and rotational movements of the dressing stick 12.

TABLE 1

| Direction of Rotation | Vertical Movement of Stick | Portions to be Dressed |
| --- | --- | --- |
| Counter-clockwise Direction | Downward Movement | a |
| Clockwise Direction | Upward Movement | b |
| Clockwise Direction | Downward Movement | c |
| Counter-clockwise Direction | Upward Movement | d |

Now, the contents of the above-mentioned Table 1 will be described below.

Figure 9:
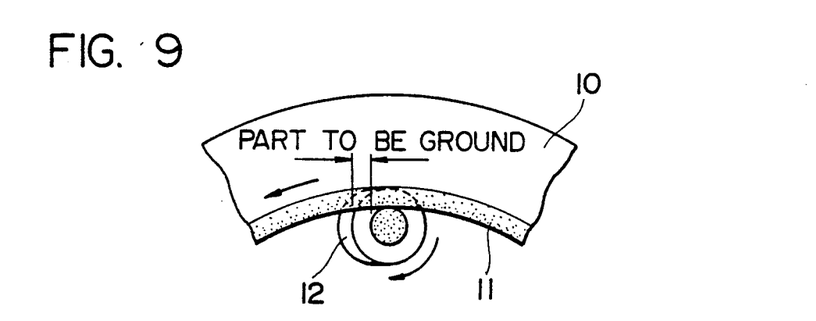
FIGS. 9 and 10 are respectively views to illustrate the dressing conditions of the inner peripheral blade which is dressed by the dressing stick.
Figure 10:
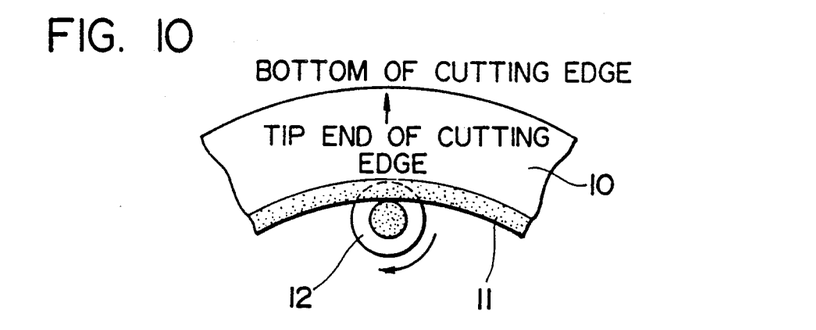

When the dressing stick 12 is moving upward while it is rotating in a clockwise direction (CW) in FIG. 7, then the surface of the inner peripheral blade 10 provides such a section as shown in FIG. 9. In this condition, what is actually ground by the dressing stick 12 is, as shown in FIG. 9, the tip end portion of the cutting edge 11 of the inner peripheral blade 10 and, in particular, because the shaft of rotation is inclined, what is actually ground is the section of the tip end portion that is present in the left when viewed from the center of the dressing stick 12. In more particular, due to the fact that the stick 12 performs the grinding operation while moving upward, the stick 12 is able to butt against only the lower portion of the left section of the tip end portion. Also, when the direction of the movements of the stick 12 is considered, then it can be understood that the dressing stick 12 is moving from the tip end portion of the inner peripheral blade toward the base portion thereof, as shown in FIG. 10.

Figure 11:
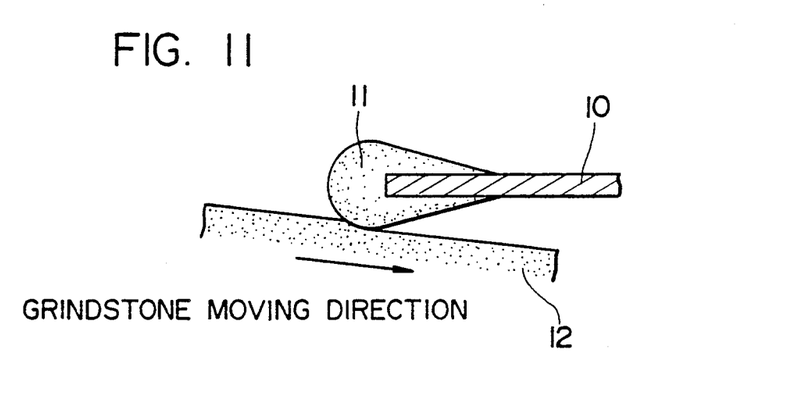
FIGS. 11 and 12 are respectively explanatory views to illustrate a relationship between the dressing stick and the cutting edge of the inner peripheral blade.

In view of the above conditions, when the portion to be ground is considered with the tip end portion of the cutting edge 11, then there is obtained a dressing condition as shown in FIG. 11. In other words, when the dressing stick 12 is moving upward while rotating in a clockwise direction (CW), then the tip end portion (that is, the portion shown by b in FIG. 6) of the cutting edge 11 is to be dressed, as can be seen from FIG. 11.

Figure 12:
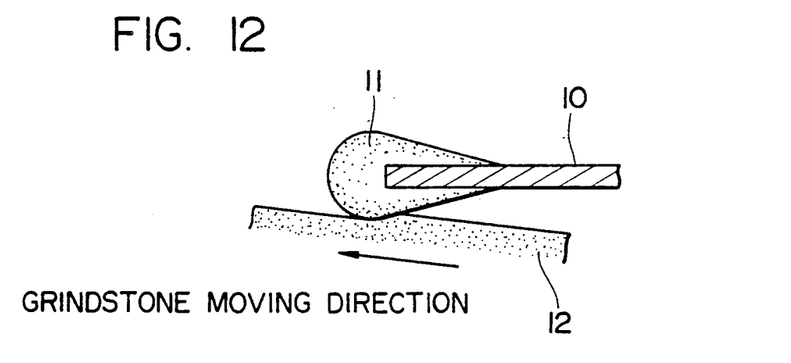

Next, when the stick 12 is moving upward while rotating in the opposite direction, that is, in a counter-clockwise direction, then the direction of the movement of the stick 12 is reversed, whereby the middle portion (that is, the portion shown by d in FIG. 6) of the cutting edge 11 can be dressed, as shown in FIG. 12.

This idea can also apply when the dressing stick 12 is moved downward, that is, if the direction of rotation of the dressing stick 12 is changed, then the portions a and c in FIG. 6 can be dressed as shown in Table 1.

Figure 13:
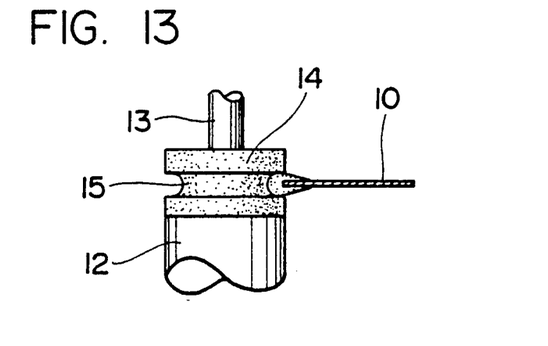
FIG. 13 is an explanatory view to illustrate how to true the inner peripheral blade by use of the dressing stick.

Now, in FIG. 13, there is shown how the truing operation is performed. That is, the cutting edge 11 of the inner peripheral blade 10 is put into the groove 15 of the hard material grindstone 14 that is fixed to the end portion of the dressing stick 12 and is then dressed therein.

Here, the movements of the dressing stick 12 such as rotation, upward- or downward-movements, and the like can be selected according to the command signals that are issued from the control part 60.

In the above operation, the signals from the respective detectors 62, 64, 66 are input to the control part 60 and, if it is judged by the control part 60 that the inner peripheral blade is in a condition requiring dressing, then the inner peripheral blade is dressed immediately according to the careers of the inner peripheral blade that have been stated before.

For example, if it is found by the detector 62 that the consumption of the electric power is increased suddenly, then the control part 60 compares such increased power consumption with a reference power consumption which has been previously stored therein, detects by this comparison that the sudden increase of the power consumption is abnormal, and then outputs a signal to that effect to the control part 60. Also, if a meter for counting the number of rotations of a spindle is used, then the control part 60 can detect that the number of rotations is abnormal and thus can output a signal indicating such abnormal number of rotations. In particular, such output signal is considered to point out that the cutting edge of the inner peripheral blade has been nicked, so that the cutting edge has to be trued. In order to perform such truing operation, the control part 60 outputs a signal to the dressing device 50 to the effect that the dressing device is to be put into operation.

Also, when the control part 60 finds out that the value of the signal from the displacement detector 64 is deviated greatly from the value of the reference signal, then the control part 60 decides that the middle portions of the tip end of the cutting edge has been loaded because such deviation points out the occurrence of vibrations, and thus the control part 60 outputs a command signal to the dressing device to the effect that the middle portions of the tip end must be dressed.

Further, the control part 60 measures the shape of the ingot end face according to the measurement signal that is sent from the ingot end face shape detector 66 (see FIG. 4). At the same time if, from the difference between the value of the actual output of the inner peripheral blade and the reference or normal value thereof, the control part 60 decides that the cutting quality of the cutting edge has been lowered in part, then the control part 60 outputs a command signal to the dressing device to the effect that a given part of the cutting edge must be set or dressed.

In addition, if the abnormal displacement of the inner peripheral blade is found from the output of the inner peripheral blade displacement detector 64, then the control part 60 refers to the career of the inner peripheral blade 10 and, if the number of uses of the inner peripheral blade 10 since the previous truing is small, then the control part 60 displays to the effect that the inner peripheral blade 10 must be replaced by a new one, thereby stopping further wafer slicing.

Besides the above-mentioned methods, the following dressing methods are also available:

(1) When the slicing resistance value is greater than a reference value, then the inner peripheral blade is to be dressed in consideration of the amount of displacement of the inner peripheral blade, the career of the inner peripheral blade, and the shape of the end face of the ingot. Or, an operator is requested to replace the inner peripheral blade with a new one or to increase the tensile force of the inner peripheral blade.

(2) When the amount of displacement of the inner peripheral blade during slicing is greater than a reference value, the displacement of the inner peripheral blade is corrected by dressing the a portion and/or the b portion in FIG. 6 by reference to the career of the inner peripheral blade. If the displacement of the blade cannot be corrected in spite of such dressing, then the inner peripheral blade is to be trued by reference to the career of the blade.

(3) When a slight amount of vibrations is found in a signal representing the amount of displacement of the inner peripheral blade, then the portions c and d in FIG. 6 are to be dressed. Also, if the sliced wafer has a poor surface condition (such as surface roughness, gloss or the like), then the portion c or d can be dressed by the operator's instruction.

(4) When the data of the detector on the shape of the end face of the ingot is greater than a reference value, then the measured shape of the ingot end face is compared with a predetermined pattern of the displacement of the inner peripheral blade and, if both of them are found identical with each other, then the portion a and/or the b portion in FIG. 6 are to be dressed in consideration of the career of the inner peripheral blade. If the comparison shows that they are not identical with each other, then a further wafer slicing must be stopped and the operator is requested to replace the inner peripheral blade with a new one or to increase the tensile force of the currently used blade.

Conventionally, an operator judges the conditions of the inner peripheral blade by perception in the light of experience and takes necessary measures. However, because the operation of the slicing machine must be stopped during this, there is no room for the operator to adopt proper measures from the viewpoint of efficiency and there is the possibility that the operator may select a wrong measure. In contrast with this, according to the invention, due to the fact a program be previously developed from a plurality of detection values and the career of the inner peripheral blade used, the possibility of the wrong measure selection can be reduced to a minimum.

Also, according to the invention, since the inner peripheral blade can be dressed effectively and immediately, the time for stopping of the operation of the slicing machine can be reduced over the prior art and also the inner peripheral blade can be used effectively and for long. Further, all of the operations necessary for such dressing can be performed automatically, which provides no danger to the operator. That is, the operations can be implemented in a reasonable manner.

Referring now to FIGS. 14 to 17, there is shown another embodiment of a drive mechanism of a dressing stick.

Figure 14:
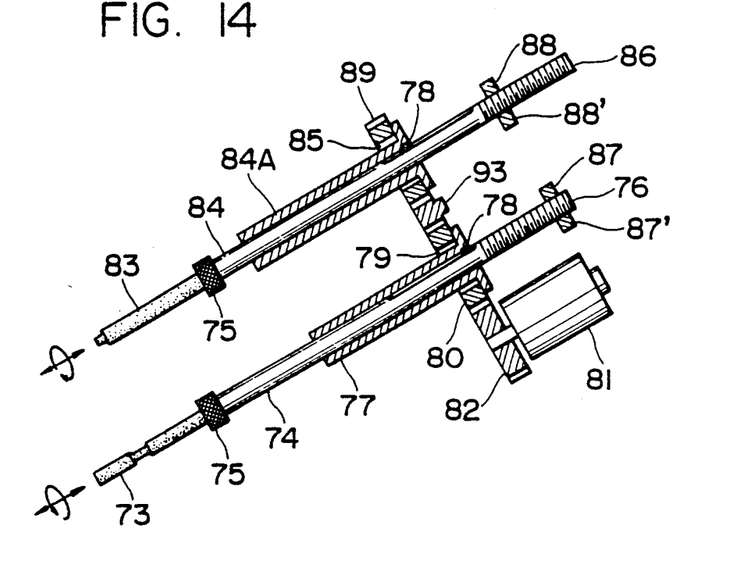
FIG. 14 is a section view of a dressing device employing two dressing sticks.

As shown in FIG. 14, a dressing device according to the invention includes two sticks 73, 83 in the leading end thereof. The two sticks 73, 83 are set to a mounting mechanism, whose position is adjustable, in such a manner that the stick 83 can be brought into contact with the upper portion of the cutting edge 11 (see FIG. 15) and the stick 73 can be brought into contact with the lower portion of the cutting edge 11 (see FIG. 16). The two sticks 73, 83 include the following mechanisms so that they can dress the upper and lower surfaces of the cutting edge 11 selectively. That is, the stick 73 is held by a shaft 74 which has a chuck 75 for stick in the left end thereof The shaft 74 has a threaded portion 76 in the right end portion thereof, which threaded portion 76 can be slidably held in and the shaft 74 is slidably held in a cylinder 77. And, there is mounted a key 78 to the inside of the cylinder 77 in an axial direction thereof, and in the shaft 74 there is formed a key groove extending axially of the shaft 74 into which the key 78 can be fitted. Also, the cylinder 77 is suitably supported by a bearing (which is not shown). The threaded portion 76 is intermeshable with two divided nuts 87, 87' which can be opened or closed. A mechanism for opening or closing the two nuts 87, 87' will be described later. A gear 80 is mounted through a well known one-way clutch 79 to the cylinder 77, so that the rotational movements of a motor 81 can be transmitted to the cylinder 77 through a gear 82.

Figure 15A:
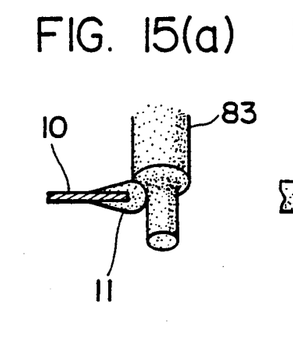
Figure 15B:
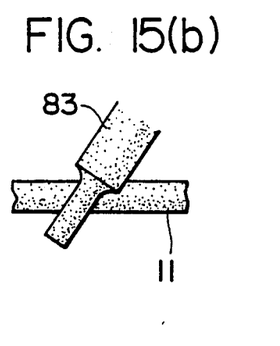
Figure 16A:
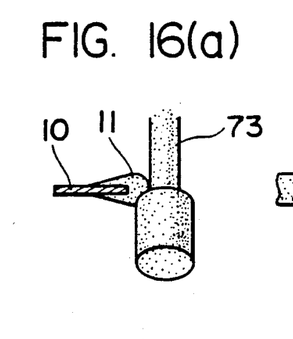
Figure 16B:
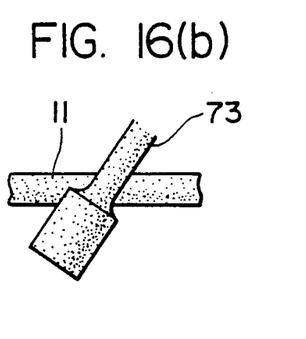

The stick 83, which is shown in the upper portion of FIG. 14, can be operated in such a manner as shown in FIG. 15 and it is held by a shaft 84 which is substantially parallel to the lower stick 73. A mechanism for holding the stick 83 is similar to that for the lower stick 73. However, a one-way clutch 85, which is interposed between a cylinder 84A and a gear 89, is adapted to perform its function in the opposite direction to the above-mentioned one-way clutch 79. And, the shaft 84 has a threaded portion 86 which is meshable with two divided nuts 88, 88' which can be opened or closed, as in the lower shaft 76.

Figure 17:
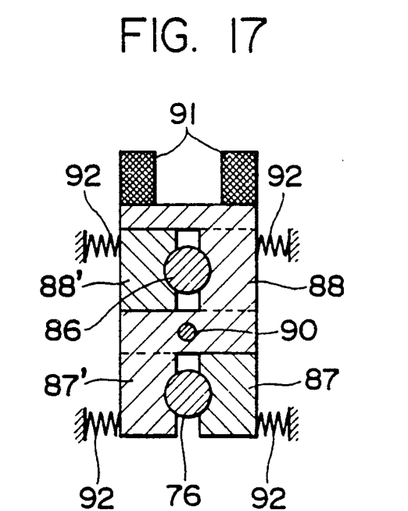

Now, in FIG. 17, there is shown a mechanism for opening and closing the two threaded portions 76, 86 of the shafts 74, 84 and the nuts 87, 87' and 88, 88' which are respectively divided in two parts. Here, the half sections 88, 87' of one nut are formed integrally with each other, while the half sections 88', 87 of the other nut are formed integrally with each other. And, they are rotationally supported by a fulcrum 90 and are pushed toward the threaded portions 76, 86 of the shafts 74, 84 by four springs 82, respectively. In operation, if two knobs 91, 91 which are shown in the upper portion of FIG. 17 are grasped, then the two nuts are separated apart from each other to thereby make the threaded portions 76, 86 free. Also, if the knobs 91, 91 are released, then the threaded portions 76, 86 and the nuts are brought into engagement with each other by means of the forces of the springs 92, respectively.

By the way, as shown in FIG. 14, there is interposed a gear for transmission between the two gears 80 and 89.

Now, the motor 81 is arranged such that it can be rotated forwardly and reversely. If the direction of the motor 81 coincides with the direction of the one-way clutch 79, then the stick 73 is moved in the longitudinal direction thereof and in the right direction in FIG. 14 while it is rotating. The entering and leaving portions of the stick 73 can be adjusted manually by opening the knobs 91 to set the stick 73 free. It should be noted here that, while the lower stick 73 is in action, the upper stick 83 does not rotate because the one-way clutch 85 is oriented in the idle direction thereof. On the other hand, if the motor 81 is rotated in the reverse direction, then the opposite operation to the above will be enforce, that is, the lower stick 73 will stop and the upper stick 83 will be rotated and moved or advanced longitudinally.

As has been described heretofore, according to the invention, the two sticks 73 and 83 are not simply pushed against the cutting edge 11, but the round-bar-shaped sticks are used as the sticks 73 and 83 and also these sticks are pushed against the cutting edge 11 while they are being rotated and moved in the longitudinal directions thereof. As a result of this, not only the dressing effect can be improved but also the upper or lower limited portions of the cutting edge 11 can be dressed selectively. Further, the directions of dressing, angles of contact of the sticks, pressing forces of the sticks and the like can be set according to cases.

In addition, according to the present invention, due to the fact that the two sticks 73 and 83 are arranged in parallel, the upper and lower portions of the cutting edge 11 can be dressed successively and efficiently.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of correcting an inner peripheral blade for use in a slicing machine, comprising the steps of:

disposing a dressing stick so as to be rotatable in clockwise and counterclockwise directions about an axis of rotation which is inclined with respect to a central axis of said inner peripheral blade and so as to be movable in an axial direction of said central axis of said inner peripheral blade as well as outwardly in a radial direction of said inner peripheral blade; and selectively dressing at least one of each of four portions of said inner peripheral blade, including an inner portion of an upper half section of an edge of said inner peripheral blade, an outer portion of said upper half section of the edge of said inner peripheral blade, an inner portion of a lower half section of the edge of said inner peripheral blade, and an outer portion of the lower half section of said edge of said peripheral blade, by combining the rotational movement of said dressing stick on one of said clockwise and counterclockwise directions with movement of said dressing stick in one of upward and downward axial directions of said central axis of said inner peripheral blade in a manner which is selected so as to dress the selected said at least one portion of said inner peripheral blade.

2. A method of correcting an inner peripheral blade as set forth in claim 1, wherein, when selected, said inner portion of said upper half section of said inner peripheral blade is dressed by rotating said dressing stick counterclockwise and moving said dressing stick downwardly in the axial direction of said central axis of said blade, said inner portion of said lower half section of the edge of said inner peripheral blade is dressed by rotating said dressing stick clockwise and moving said dressing stick upwardly in the axial direction of said central axis of said blade, said outer portion of said upper half section of the edge of said inner peripheral blade is dressed by rotating said dressing stick clockwise and moving said dressing stick downwardly in the axial direction of said central axis of said blade, and said outer portion of said lower half section of said edge of the inner peripheral blade is dressed by rotating said dressing stick counterclockwise and moving said dressing stick upwardly in the axial direction of said central axis of said blade.

3. A method of correcting an inner peripheral blade as set forth in claim 1, wherein the said at least one portion which is dressed is selected by inputing a reference value of at least one parameter indicative of a need for correction of at least one of said portions into a computer control part; detecting the value of said at least one parameter resulting from slicing of a wafer from an ingot; and determining the surface portions to be dressed from differences between said detected and reference values.

4. A method of correcting an inner peripheral blade as set forth in claim 3, wherein said parameter is an amount of displacement of said inner peripheral blade occurring during slicing.

5. A method of correcting an inner peripheral blade as set forth in claim 3, wherein said parameter is the shape of an end face of said ingot after a wafer has been sliced off.

6. A method of correcting an inner peripheral blade for use in a slicing machine, comprising the steps of:

inputting a reference value of at least one parameter that is indicative of a need for correction of at least one obliquely oriented portion of an edge of an inner peripheral blade into a computer control part;

detecting the value of said at least one parameter resulting from slicing of a wafer from an end of an ingot; and automatically dressing said at least one portion when said detected value differs from said reference value by a predetermined amount;

wherein said dressing step is performed by disposing a dressing stick so as to be rotatable in clockwise and counterclockwise directions about an axis of rotation which is inclined with respect to a central axis of said inner peripheral blade and so as to be movable in an axial direction of said central axis of said inner peripheral blade as well as outwardly in a radial direction of said inner peripheral blade.

7. A method of correcting an inner peripheral blade according to claim 6, wherein said dressing step is performed by a dressing device having a plurality of dressings sticks, said dressing step being performed by at least one of the dressing sticks in dependence upon whether the surface portion to be dressed is an upper or lower surface.

8. A method of correcting an inner peripheral blade as set forth in claim 6, wherein said parameter is an amount of displacement of said inner peripheral blade occurring during slicing.

9. A method of correcting an inner peripheral blade as set forth in claim 6, wherein said parameter is the shape of an end face of said ingot after a wafer has been sliced off.

* * * * *